(12) United States Patent
Halimi

(10) Patent No.: US 10,962,993 B2
(45) Date of Patent: *Mar. 30, 2021

(54) MANUAL CONTROL FOR ACTUATED FLUID MONITORING AND CONTROL DEVICE

(71) Applicant: Henry M. Halimi, Los Angeles, CA (US)

(72) Inventor: Henry M. Halimi, Los Angeles, CA (US)

(73) Assignee: FLO TECHNOLOGIES, INC., Culver City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/977,546

(22) Filed: May 11, 2018

(65) Prior Publication Data

US 2018/0259982 A1 Sep. 13, 2018

Related U.S. Application Data

(63) Continuation-in-part of application No. 15/849,669, filed on Dec. 21, 2017, which is a continuation of
(Continued)

(51) Int. Cl.
| | |
|---|---|
| G05D 16/20 | (2006.01) |
| G05D 7/06 | (2006.01) |
| F16K 31/04 | (2006.01) |
| F16K 5/06 | (2006.01) |

(Continued)

(52) U.S. Cl.
CPC .......... *G05D 16/20* (2013.01); *F16K 5/0647* (2013.01); *F16K 31/047* (2013.01);
(Continued)

(58) Field of Classification Search
CPC .... G05D 16/20; G05D 7/0635; F16K 5/0647; F16K 31/047; F16K 31/055; F16K 31/60
See application file for complete search history.

(56) References Cited

U.S. PATENT DOCUMENTS 4,546,671 A * 10/1985 Fry .................... F16K 31/05
74/625
5,038,821 A 8/1991 Maget
(Continued)

OTHER PUBLICATIONS

Johnson Controls, Inc. Valves and Actuators Catalog, 2014 https://www.johnsoncontrols.com/buildings/hvac-controls/valves-and-actuators.†

*Primary Examiner* — Kevin R Barss
(74) *Attorney, Agent, or Firm* — Hackler Daghighian Martino & Novak

(57) ABSTRACT

A fluid control device connectable to a fluid pipe includes an electric motor mechanically connected to a fluid valve configured to open and close the fluid valve. A manual motor disengagement knob is at least partially accessible to a user and mechanically connected to the fluid valve. The knob is configured to manually disengage the mechanical connection between the electric motor and the fluid valve while still engaging the fluid valve allowing the user to manually close or open the fluid valve without the assistance or interference of the electric motor. This is accomplished by a manual over-ride primary shaft translatably connected to a clutch shaft and in turn to the fluid valve, where the shaft in a first position is mechanically connected to the electric motor and in a second position the shaft is not mechanically connected to the electric motor.

20 Claims, 11 Drawing Sheets

Related U.S. Application Data application No. 14/182,213, filed on Feb. 17, 2014, now Pat. No. 9,857,805.

(60) Provisional application No. 62/504,679, filed on May 11, 2017, provisional application No. 61/766,105, filed on Feb. 18, 2013.

(51) Int. Cl.
*F16K 31/60* (2006.01)
*F16K 31/05* (2006.01)

(52) U.S. Cl.
CPC ............ *F16K 31/055* (2013.01); *F16K 31/60* (2013.01); *G05D 7/0635* (2013.01); *Y10T 137/7761* (2015.04)

(56) References Cited

U.S. PATENT DOCUMENTS

| | | |
|---|---|---|
| 5,660,198 A | 8/1997 | McClaran |
| 5,927,400 A | 7/1999 | Bononi et al. |
| 5,971,011 A | 10/1999 | Price |
| 6,539,968 B1 | 4/2003 | White et al. |
| 6,789,411 B2 | 9/2004 | Roy |
| 6,963,808 B1 | 11/2005 | Addink et al. |
| 7,119,698 B2 | 10/2006 | Schleich et al. |
| 7,304,587 B2 | 12/2007 | Boaz |
| 7,317,404 B2 | 1/2008 | Cumeralto et al. |
| 7,330,796 B2 | 2/2008 | Addink et al. |
| 7,360,413 B2 | 4/2008 | Jeffries et al. |
| 7,383,721 B2 | 6/2008 | Parsons et al. |
| 7,920,983 B1 | 4/2011 | Peleg et al. |
| 7,966,099 B2 | 6/2011 | Fima |
| 7,969,318 B2 | 6/2011 | White et al. |
| 8,701,703 B2 | 4/2014 | Scott et al. |
| 9,019,120 B2 | 4/2015 | Brinoiak et al. |
| 9,297,150 B2 † | 3/2016 | Klicpera |
| 9,494,480 B2 † | 11/2016 | Klicpera |
| 9,857,805 B2 * | 1/2018 | Halimi .................. G05D 16/20 |
| 2005/0016592 A1 | 1/2005 | Jeromson et al. |
| 2006/0028355 A1 | 2/2006 | Patterson et al. |
| 2014/0130878 A1 | 5/2014 | Marinez |

\* cited by examiner
† cited by third party

MANUAL CONTROL FOR ACTUATED FLUID MONITORING AND CONTROL DEVICE

CROSS-REFERENCE TO RELATED APPLICATIONS

This non-provisional patent application claims priority to provisional application 62/504,679 filed on May 11, 2017. This non-provisional patent application also claims priority to the continuation patent application Ser. No. 15/849,669 filed on Dec. 21, 2017 (our docket FLOT10038CON), which itself claimed priority to non-provisional application Ser. No. 14/182,213 filed Feb. 17, 2014 (our docket FLOT10038UA), which itself claimed priority to provisional application 61/766,105 filed on Feb. 18, 2013, the contents of which all applications are fully incorporated herein with this reference.

DESCRIPTION

Field of the Invention

The present invention generally relates to controlling fluid flow in a house, residence or building. More particularly, the present invention relates to the structure and method of providing a manual control of fluid flow through an actuated fluid monitoring and control device.

Background of the Invention

The plumbing industry has lagged behind its related industries in development of fundamentally new and innovative technologies in recent decades. Due to the passive nature of fluids, the delivery of liquid, gas and air has hardly changed since their initial development decades ago. Improvements in the industry have traditionally been focused on product redesigns and the use of modified materials. The net effect of this stagnation has become aging product lines and sagging margins. Emergence of environmental, health, safety, conservation and also the increasing need for water damage mitigation has created enormous untapped opportunities.

The Applicant previously taught in the '213 and '669 applications a device that was electronically actuated either wirelessly or through a hard wire connection. The device could open and close a fluid valve, depending on the need or testing that was desired at the time. However, during a power outage, electronic control failure or motor failure or from any other related failure, the device may not be electronically actuated to either an open or a closed state. Therefore, a backup structure and method is needed such that the device can also be manually closed or open by a user that has access to the device. The present invention fulfills these needs and provides other related advantages.

SUMMARY OF THE INVENTION

An exemplary embodiment of the present invention is a fluid control device 100 connectable in series to a fluid pipe. The fluid control device includes a main valve body 1 including a fluid inlet 54 in fluidic communication with a fluid outlet 55 and configured to be connectable in series to the fluid pipe. A fluid valve 4 is disposed in series within the main valve body separating the fluid inlet and fluid outlet, the fluid valve controlling a fluid flow through the main valve body, wherein the fluid valve may be a ball valve. An electric motor 20 is mechanically connected to the fluid valve, the electric motor configured to open and close the fluid valve. A temperature sensor 11t is coupled to the main valve body monitoring a temperature of the fluid flow within the main valve body. A pressure sensor 11p is coupled to the main valve body monitoring a pressure of the fluid flow within the main valve body. A flow rate sensor 5 is coupled to the main valve body monitoring a flow rate of the fluid flow within the main valve body. A fluid control device processor 56 is in electrical communication with the electric motor, the temperature sensor, the pressure sensor and the flow sensor. A fluid control device input/output port 57 is in electrical communication with the fluid control device processor, the fluid control device input/output port configured to be in electrical communication with a fluid monitoring and control system. A manual over-ride control mechanism 101 is mechanically connected to the fluid valve and accessible by a user. The manual over-ride control mechanism is configured to manually disengage the mechanical connection between the electric motor and the fluid valve while still engaging the fluid valve, thereby allowing the user to manually close or open the fluid valve without the assistance or interference of the electric motor.

The manual over-ride control mechanism may include a clutch shaft 13 and a manual over-ride primary shaft 18, wherein the clutch shaft is rotatably disposed within the fluid control device and mechanically connected to the fluid valve wherein a rotation of the clutch shaft results in the same rotation of the fluid valve. The manual over-ride primary shaft may be translatably connected to the clutch shaft wherein a rotation of the manual over-ride primary shaft results in the same rotation of the clutch shaft yet the manual over-ride primary shaft can still translate with respect to the clutch shaft.

The manual over-ride primary shaft may include a manual over-ride primary shaft spur gear 59, wherein the manual over-ride primary shaft is translatable relative to the clutch shaft between a first position 102 and a second position 103 by the user, wherein in the first position the manual over-ride primary shaft spur gear is mechanically connected to an electric motor output shaft 60 of the electric motor, and wherein in the second position the manual over-ride primary shaft spur gear is not mechanically connected to the electric motor output shaft.

A manual motor disengagement knob 45 is fixedly attached to the manual over-ride primary shaft, wherein the manual motor disengagement knob is disposed at least partially accessible to the user.

A bias element 14 may be disposed between the manual over-ride primary shaft and the clutch shaft, wherein the bias element is configured to bias the manual over-ride primary shaft to the first position. The bias element may be a clutch spring.

A motor coupling spur gear 16 may be fixedly attached to the electric motor output shaft, wherein the motor coupling spur gear is mechanically connected to the manual over-ride primary shaft spur gear when the manual over-ride primary shaft is in the first position.

An intermediate spur gear 15 may be rotatably connected within the fluid control device and disposed between the motor coupling spur gear and the manual over-ride primary shaft spur gear, wherein the intermediate spur gear is mechanically connected to the manual over-ride primary shaft spur gear when the manual over-ride primary shaft is in the first position.

The manual over-ride spur gear, the motor coupling spur gear and the intermediate spur gear may be all straight spur gears.

The temperature sensor and pressure sensor may be disposed downstream of the fluid valve on a fluid outlet side.

The fluid control device input/output port may be configured to be in electrical communication with the fluid monitoring and control system through a hard-wired communication line or through a wireless transmitter and receiver.

BRIEF DESCRIPTION OF THE DRAWINGS

The accompanying drawings illustrate the invention. In such drawings.

DETAILED DESCRIPTION OF THE PREFERRED EMBODIMENTS

As used herein for the sake of consistency and ease of understanding the terminology and numeral elements for describing the present invention, the Applicant has used the same terminology and numeral elements as the engineering drawings previously submitted in the provisional application 62/504,679 filed on May 11, 2017, the contents of which are fully incorporated herein with this reference. Accordingly, the numeral elements may be different in comparison to the other previously filed non-provisional application Ser. Nos. 15/849,669 and 14/182,213, however all of these applications are referring to similar structures and teachings.

Figure 1A:
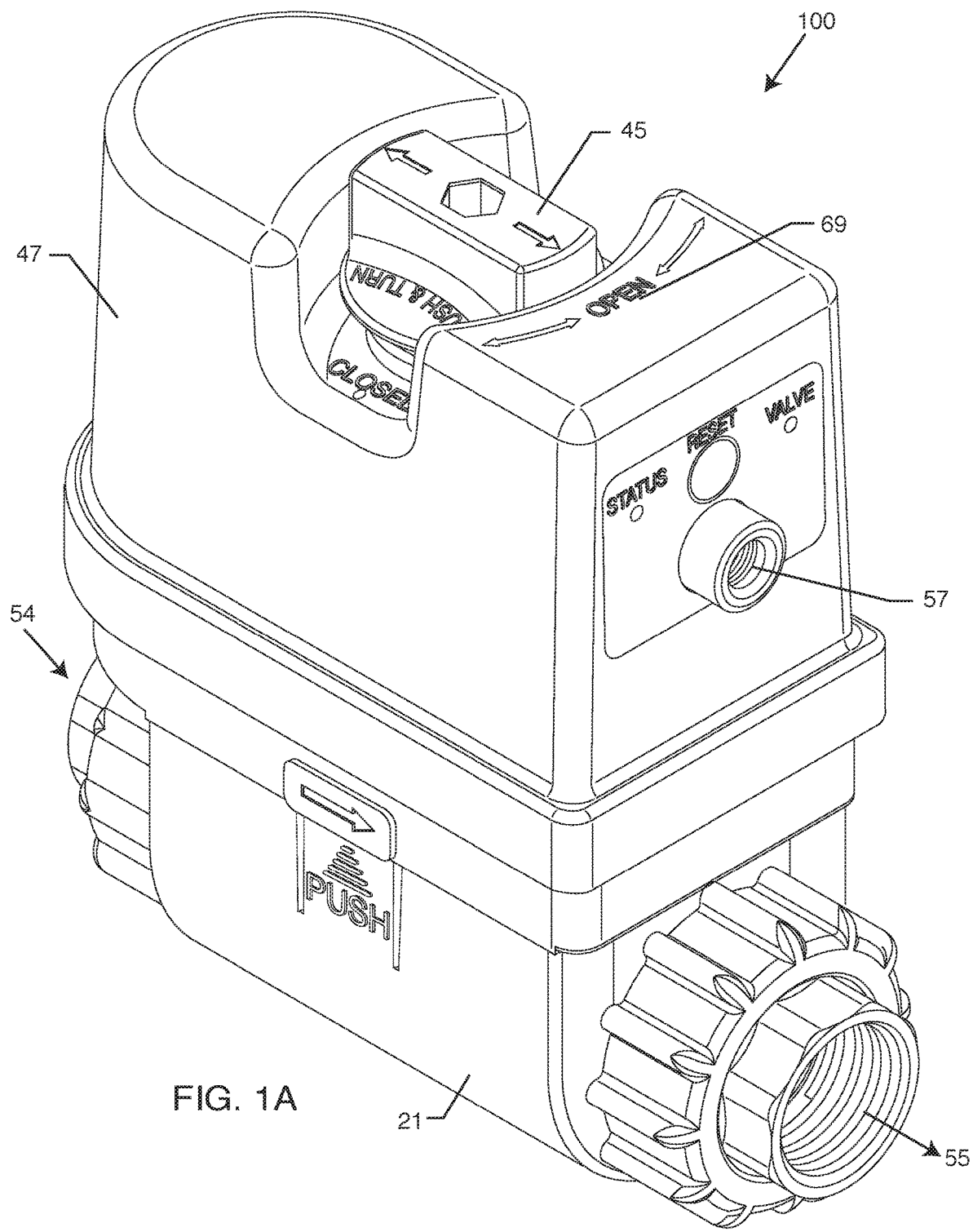
FIG. 1A is an isometric view of an exemplary fluid control device of the present invention.
Figure 1B:
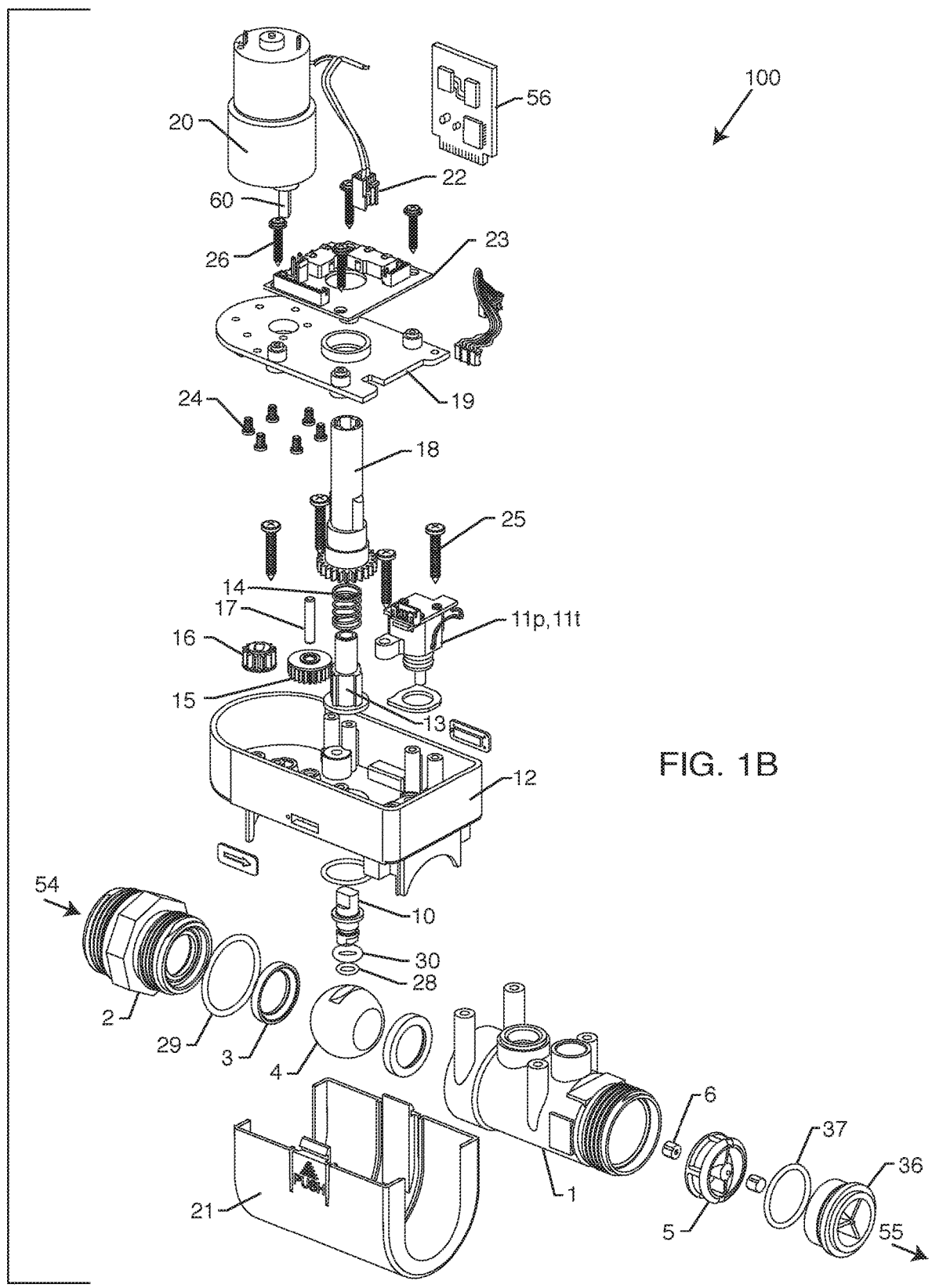
FIG. 1B is an exploded isometric view of the structure of FIG. 1A.
Figure 2B:
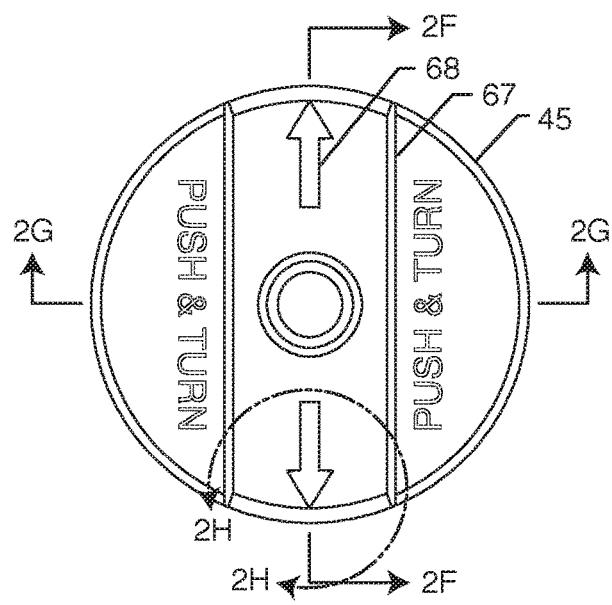
FIG. 2B is a top view of the structure of FIG. 2A.
Figure 2A:
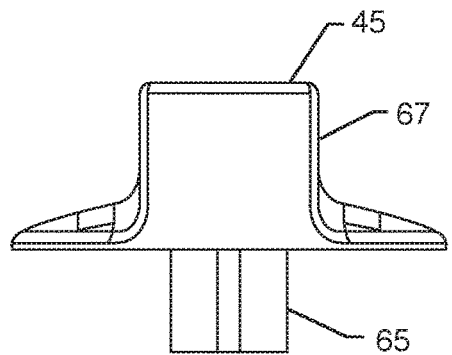
FIG. 2A is a front view of a manual motor disengagement knob of the structure of FIGS. 1A and 1B.
Figure 2D:
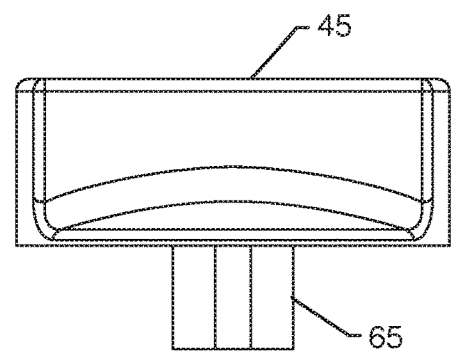
FIG. 2D is a right side view of the structure of FIG. 2A.
Figure 2C:
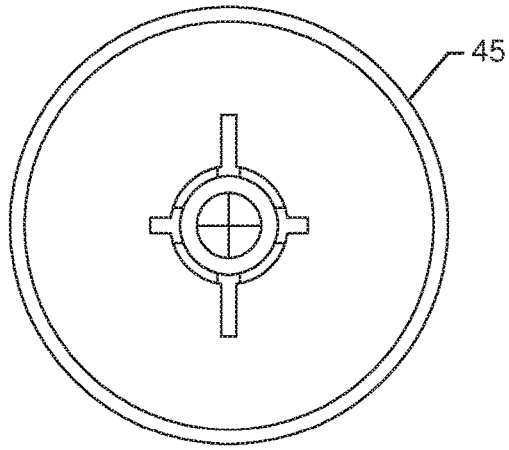
FIG. 2C is a bottom view of the structure of FIG. 2A.
Figure 2E:
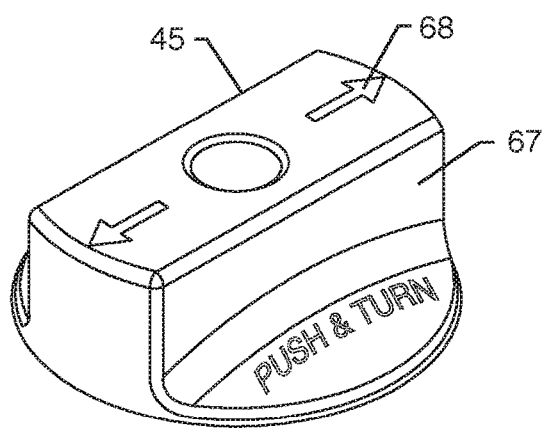
FIG. 2E is an isometric view of the structure of FIG. 2A.
Figure 2G:
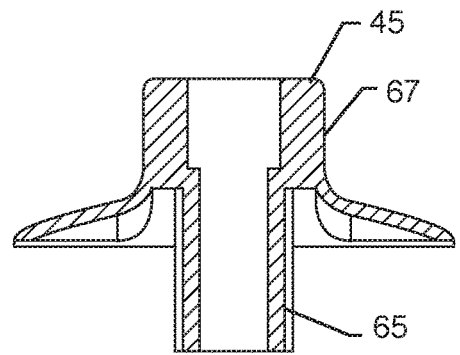
FIG. 2G is a sectional view taken along lines 2G-2G from FIG. 2B.
Figure 2F:
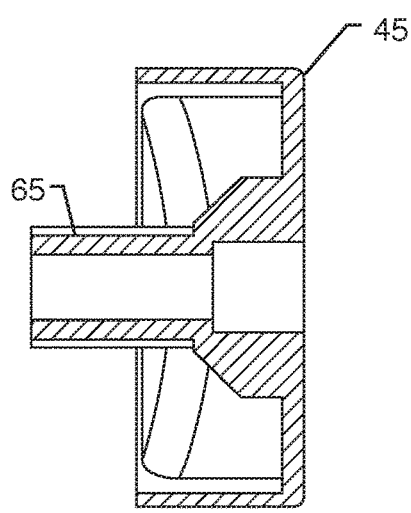
FIG. 2F is a sectional view taken along lines 2F-2F from FIG. 2B.
Figure 2H:
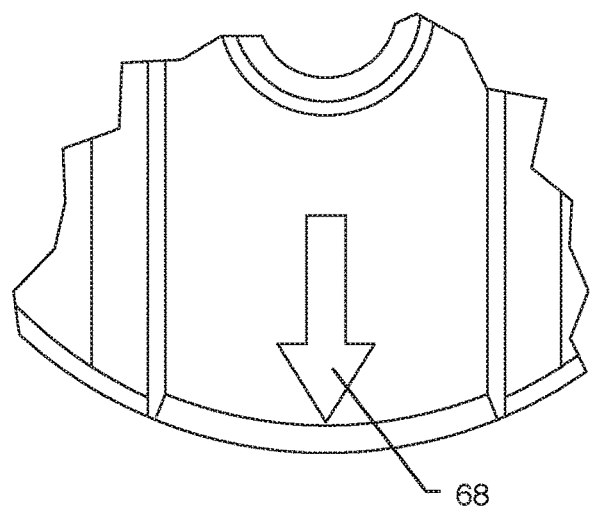
FIG. 2H is an enlarged view taken along lines 2H-2H from FIG. 2B.

FIGS. 1A and 1B show an exemplary embodiment of the present invention which is a fluid control device 100 connectable in series to a fluid pipe. There are many ways in which the present invention can be installed into a fluid pipe. For example, an existing pipe may be cut and the present invention soldered in place. Alternatively, the present invention can include screw threads and attached with various pipe threads and so forth as is known to those skilled in the art. The important aspect is that the device 100 is in series with the fluid flow, meaning the fluid flow in the existing pipe now passes through the device 100.

The fluid control device includes a main valve body 1 including a fluid inlet 54 in fluidic communication with a fluid outlet 55 and configured to be connectable in series to the fluid pipe. A fluid valve 4 is disposed in series within the main valve body separating the fluid inlet and fluid outlet, the fluid valve controlling a fluid flow through the main valve body. As shown herein, the fluid valve may be a ball valve. However, other valves could be used as well beyond ball valves, as this teaching could be applied to a wide array of valve types and configurations.

An electric motor 20 is mechanically connected to the fluid valve and the electric motor is configured to open and close the fluid valve. Here, there are various structures discussed herein which mechanically connect the electric motor 20 to the ball valve 4. For example, the ball valve 4 is mechanically connected to a valve stem 10 that then is attached to a system of gears and structures mechanically connected to the output shaft 60 of the electric motor 20 that facilitate the present invention. This teaching shows just one of many ways the electric motor 20 can be mechanically coupled to the fluid valve 4, as this teaching is not limited to just the embodiment shown and taught herein.

A temperature sensor 11t is coupled to the main valve body monitoring a temperature of the fluid flow within the main valve body. A pressure sensor 11p is also coupled to the main valve body monitoring a pressure of the fluid flow within the main valve body. Additionally, a flow rate sensor 5 is coupled to the main valve body monitoring a flow rate of the fluid flow within the main valve body. It is noted that the temperature sensor, pressure sensor and even the flow rate sensor are disposed downstream of the fluid valve on a fluid outlet side.

A fluid control device processor 56 is in electrical communication with the electric motor, the temperature sensor, the pressure sensor and the flow sensor. A fluid control device input/output port 57 is in electrical communication with the fluid control device processor, the fluid control device input/output port configured to be in electrical communication with a fluid monitoring and control system. The fluid control device input/output port may be configured to be in electrical communication with the fluid monitoring and control system through a hard-wired communication line or through a wireless transmitter and receiver, variations of which were more fully described in the '213 and '669 applications.

Figure 8:
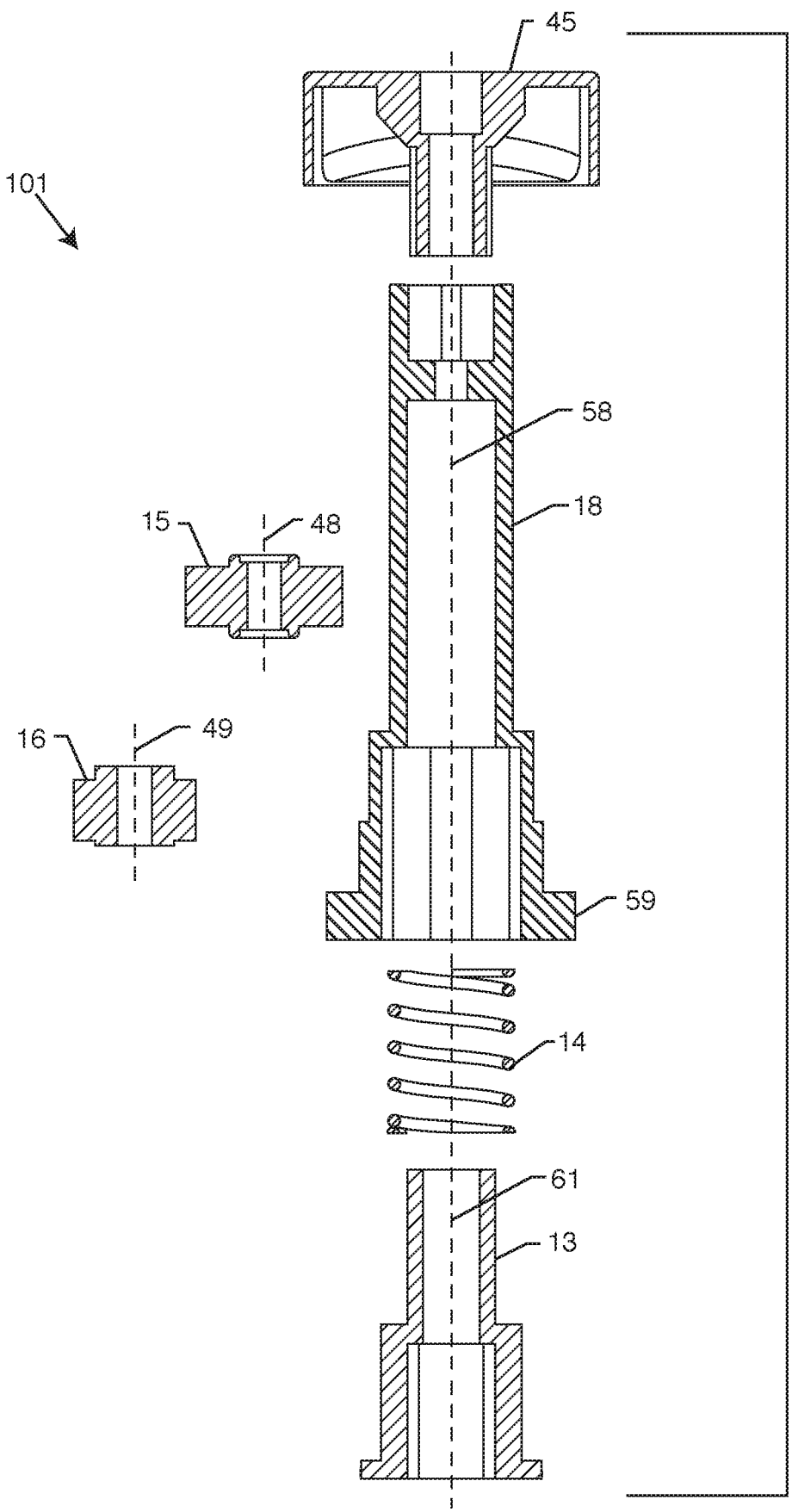
FIG. 8 is a simplified exploded sectional view showing only the critical components of the manual over-ride control mechanism of the present invention.
Figure 9:
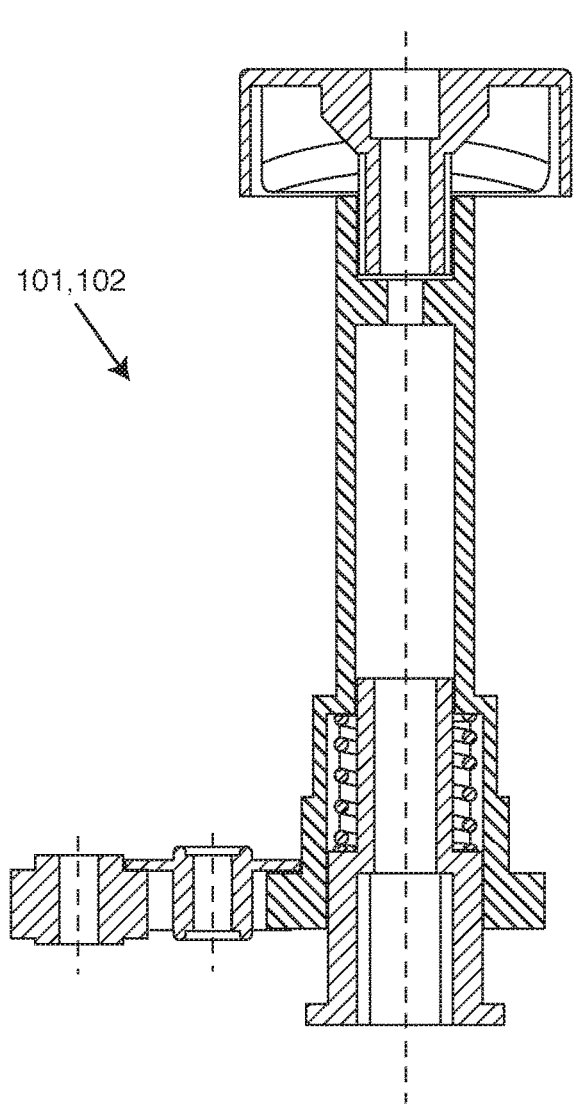
FIG. 9 is a sectional view similar to FIG. 8, now showing the relevant components in a first position where the electric motor is mechanically coupled to the ball valve.
Figure 10:
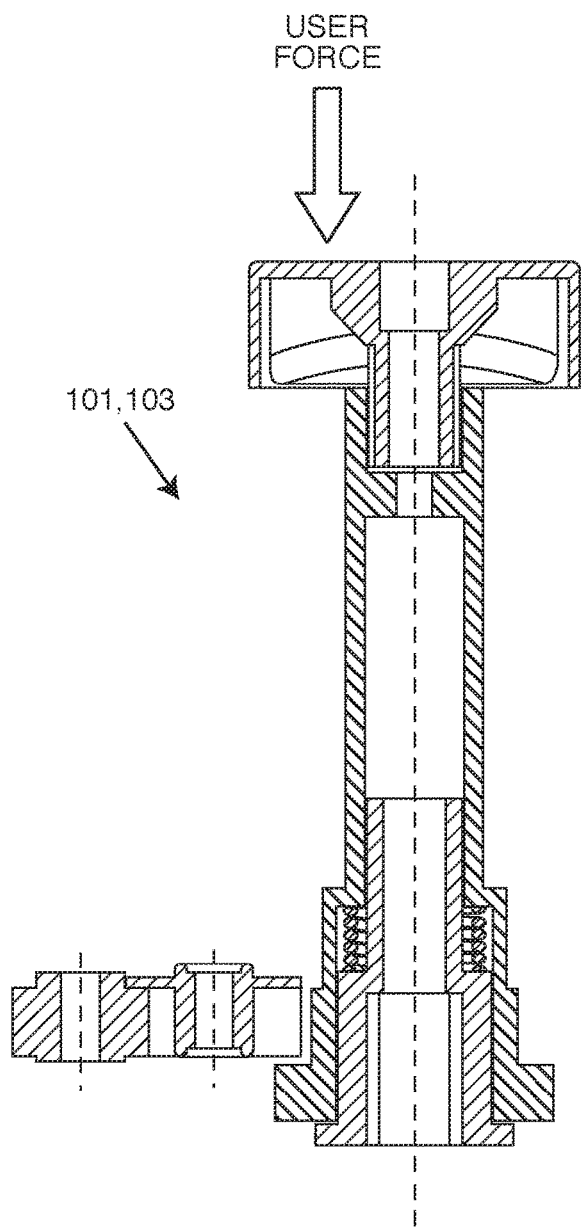
FIG. 10 is a sectional view similar FIG. 8 and FIG. 9, now showing the relevant components in a second position where the electric motor is not mechanically coupled to the ball valve.

A manual over-ride control mechanism 101 most easily shown in FIGS. 8-10 and is mechanically connected to the fluid valve 4 and accessible by a user. The manual over-ride control mechanism 101 is configured to manually disengage the mechanical connection between the electric motor 20 and the fluid valve 4 while still engaging the fluid valve 4, thereby allowing the user to manually close or open the fluid valve without the assistance or interference of the electric motor.

Referring to FIG. 8, the manual over-ride control mechanism 101 includes a clutch shaft 13 and a manual over-ride primary shaft 18. The clutch shaft 13 is rotatably disposed within the fluid control device and mechanically connected to the fluid valve 4 by the valve stem 10 wherein a rotation of the clutch shaft 13 results in the same rotation of the fluid valve 4. This means that the clutch shaft 13 is rotating about a clutch shaft axis 61. This then means the ball valve 4 is also rotating about the same clutch shaft axis 61 as they would share a common axis of rotation.

The manual over-ride primary shaft 18 is translatably connected to the clutch shaft wherein a rotation of the manual over-ride primary shaft 18 about the manual over-ride primary shaft axis 58 results in the same rotation of the clutch shaft. Again, the axis 61 and axis 58 share the same axis or are the same axis. Yet, the manual over-ride primary shaft 18 can still translate with respect to the clutch shaft 13. This is because the clutch shaft 13 is cylindrically shaped to nest and extend within a similarly shaped center of the manual over-ride primary shaft 18. However, the clutch shaft 13 has a multitude of extensions 62 (extended channels) that are similarly shaped to slide within the recessions 63 (recessed channels) inside the manual over-ride primary shaft 18. While the manual over-ride primary shaft 18 can slide/translate with respect to the clutch shaft 13, it cannot rotate with respect to the clutch shaft 13 due to the extensions 62 and recessions 63. Here, there are shown four extensions 62 and four recessions 63. It is understood that one, or any number of extensions and recessions could be used. Also, other shapes and configurations could be used such as splined shafts and other translatable but not rotatable geometries.

The manual over-ride primary shaft includes a manual over-ride primary shaft spur gear 59. This spur gear 59 is then coupled to other spur gears that interface with the output shaft 60 of the electric motor 20. Now that it is understood that the manual over-ride primary shaft is translatable relative to the clutch shaft, it is seen best in FIGS. 9 and 10 that the spur gear 59 can move between a first position 102 (shown in FIG. 9) and a second position 103 (shown in FIG. 10) by the user. In the first position 102 the manual over-ride primary shaft spur gear 59 is mechanically connected to an electric motor output shaft 60 of the electric motor. Then, in the second position 103 the manual over-ride primary shaft spur gear 59 is not mechanically connected to the electric motor output shaft.

A manual motor disengagement knob 45 is fixedly attached to the manual over-ride primary shaft. Here a screw can used to secure the knob 45 to the shaft 18, where the screw head pulls the knob down onto the shaft 18 as it bites into the smaller diameter portion 64. The knob 45 has a knob extension 65 that also is formed to non-rotatably nest and fit within the shaft distal end 66. The knob 45 also has a raised narrow portion 67 such that it is easy for a user to grasp and turn the knob. The knob 45 also has an arrow indicia 68 molded therein such that it can be easily determined by the user whether the ball valve is open or closed based on a corresponding housing indicia 69 on the housing.

Referring back to FIG. 8, a bias element 14 is disposed between the manual over-ride primary shaft and the clutch shaft, wherein the bias element is configured to bias the manual over-ride primary shaft to the first position. The bias element 14 as shown herein is a clutch spring 14. The spring 14 is designed to fit on the outside of the clutch shaft 13 but on the inside of the manual over-ride primary shaft 18. As seen in FIG. 9, the clutch spring is already compressed thereby biasing the shaft 18 to be engaged with the motor. Then, in FIG. 10 the clutch spring 14 has been further compressed when the user has pressed down on the knob 45. In this way, the spur gear 59 is no longer mechanically coupled to the electric motor 20.

The clutch (compression) spring 14 could be replaced with other alternatives. For example, other materials could be used such as elastomeric structures that also create a bias force. Alternatively, a magnet system could be used to either attract or repeal the manual over-ride primary shaft 18 into its upper position.

In the embodiments shown herein, the user presses down the knob 45 to disengage the electric motor 20. However, this teaching could also be used to create a knob that is pulled to then disengage the electric motor, as this disclosure is not intended to limit the teaching just to the embodiment shown and taught herein.

A motor coupling spur gear 16 is fixedly attached to the electric motor output shaft 60. The output shaft 60 will have at least one flat surface such that a good and reliable connection can be made. Here, there are two similarly shaped flat sides 70 of the motor coupling spur gear 16. The flat sides 70 engage the output shaft 60 for a rotation free connection. In other words the output shaft 60 is keyed to correspond to the keyed pattern on the inside of the motor coupling spur gear 16. As is understood by those skilled in the art, various shapes or bonding methods could be used to fixedly couple the drive motor gear 16 to the output shaft 60 of the electric motor 20. When the motor rotates, so does the gear 16 about its motor coupling spur gear axis 49.

In another embodiment not shown, it is understood that if the motor coupling spur gear was appropriately sized and spaced, it could directly interact with the spur gear 59 on the manual over-ride primary shaft 18.

In this embodiment, an intermediate spur gear 15 is rotatably connected within the fluid control device and disposed between the motor coupling spur gear 16 and the manual over-ride primary shaft spur gear 59. The motor coupling spur gear 16 is disposed adjacent to and interacts with the intermediate spur gear 15. In other words, the gears are engaged with one another. The intermediate spur gear 15 is rotatably disposed within the device such that it can spin about its intermediate spur gear axis 48 and is held by gear pin 17. When the motor coupling spur gear rotates one direction, it in turn causes the intermediate spur gear 15 to rotate the opposite direction. As is seen in FIG. 9, the intermediate spur gear 15 is mechanically connected to the manual over-ride primary shaft spur gear 59 when the manual over-ride primary shaft 18 is in the first position.

Figure 3B:
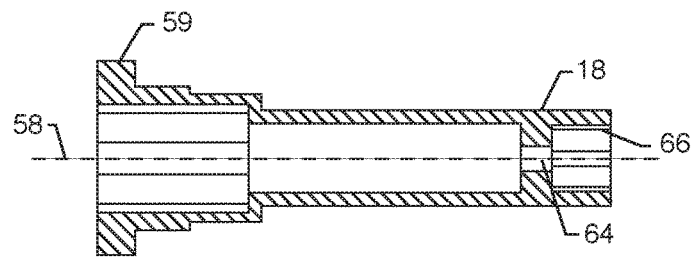
FIG. 3B is a sectional front view of the structure of FIG. 3A.
Figure 3C:
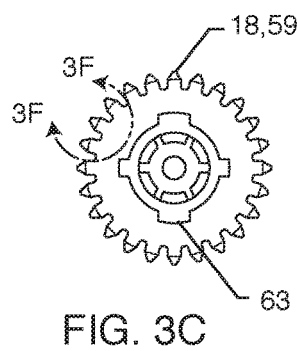
FIG. 3C is a left side view of the structure of FIG. 3A.
Figure 3A:
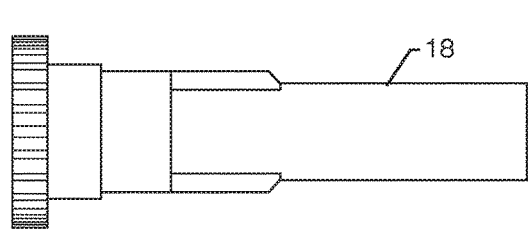
FIG. 3A is a front view of a manual over-ride primary shaft of the structures of FIGS. 1A and 1B.
Figure 3D:
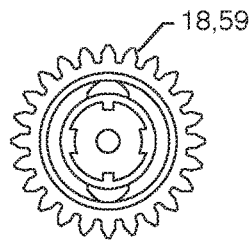
FIG. 3D is a right side view of the structure of FIG. 3A.
Figure 3E:
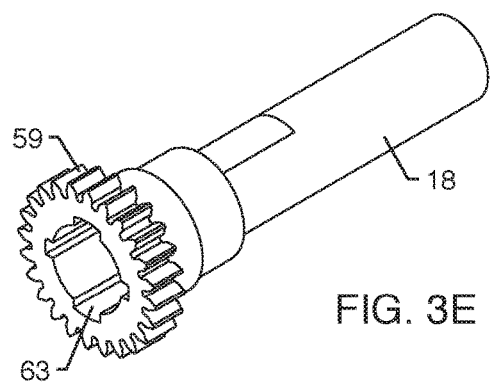
FIG. 3E is an isometric view of the structure of FIG. 3A.
Figure 3F:
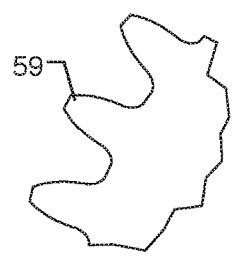
FIG. 3F is an enlarged view taken along lines 3F-3F from FIG. 3C.
Figure 4B:
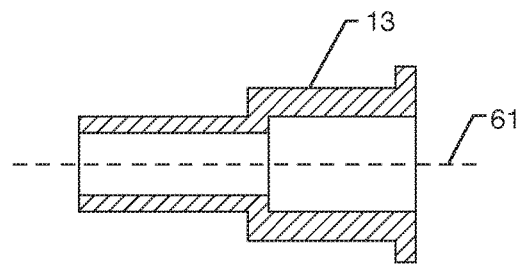
FIG. 4B is a sectional front view of the structure of FIG. 4A.
Figure 4C:
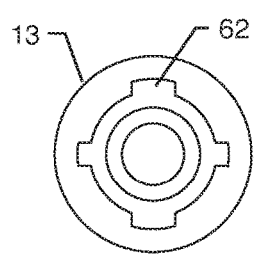
FIG. 4C is a left side view of the structure of FIG. 4A.
Figure 4A:
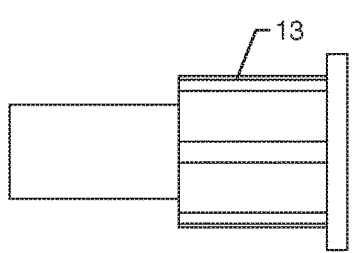
FIG. 4A is a front view of a clutch shaft of the structures of FIGS. 1A and 1B.
Figure 4D:
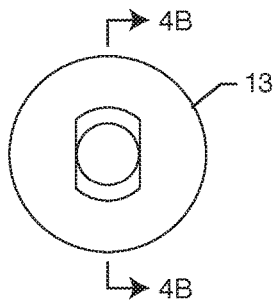
FIG. 4D is a right side view of the structure of FIG. 4A.
Figure 4E:
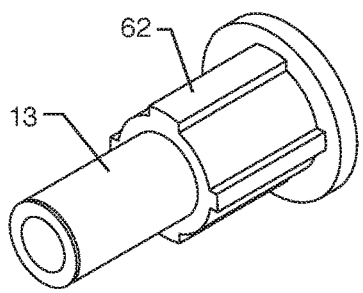
FIG. 4E is an isometric view of the structure of FIG. 4A.
Figure 5A:
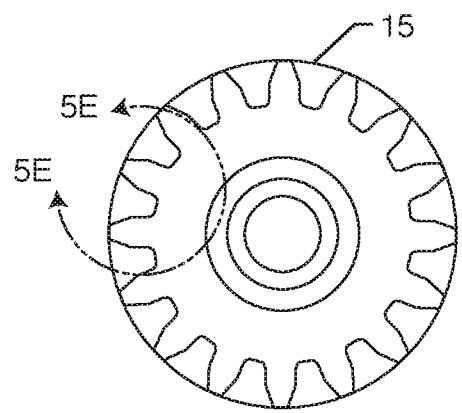
FIG. 5A is a front view of an intermediate spur gear of the structures of FIGS. 1A and 1B.
Figure 5B:
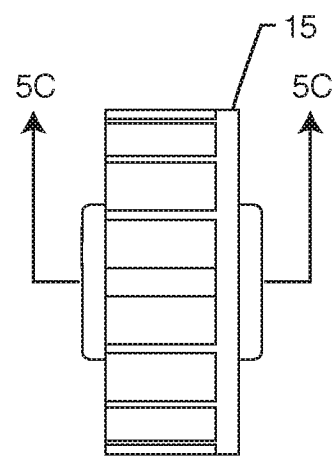
FIG. 5B is a right side view of the structure of FIG. 5A.
Figure 5C:
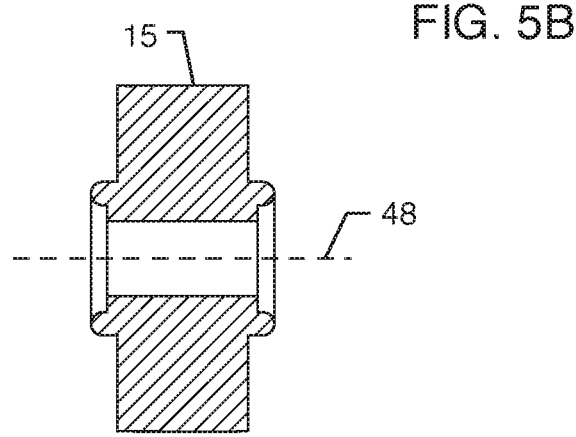
FIG. 5C is a sectional view taken along lines 5C-5C from FIG. 5B.
Figure 5D:
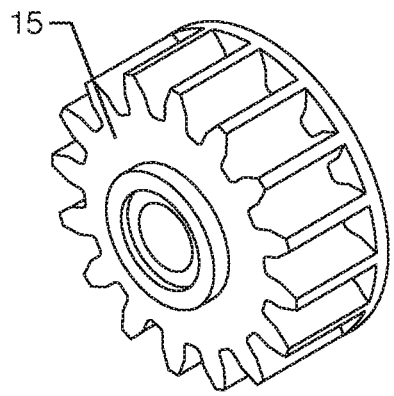
FIG. 5D is an isometric view of the structure of FIG. 5A.
Figure 5E:
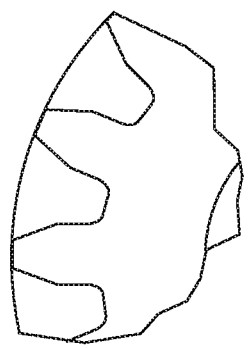
FIG. 5E is an enlarged view taken along lines 5E-5E from FIG. 5A.
Figure 6A:
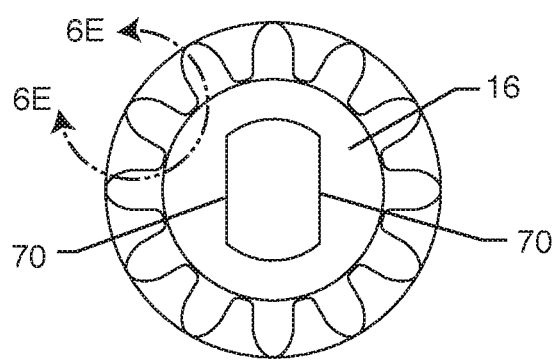
FIG. 6A is a front view of an intermediate spur gear of the structures of FIGS. 1A and 1B.
Figure 6B:
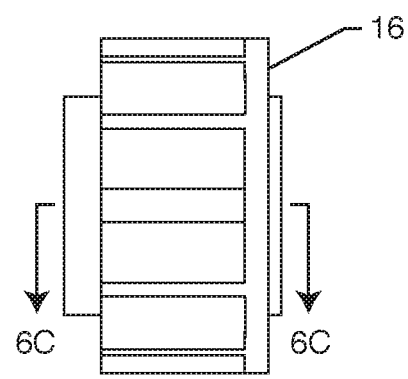
FIG. 6B is a right side view of the structure of FIG. 6A.
Figure 6C:
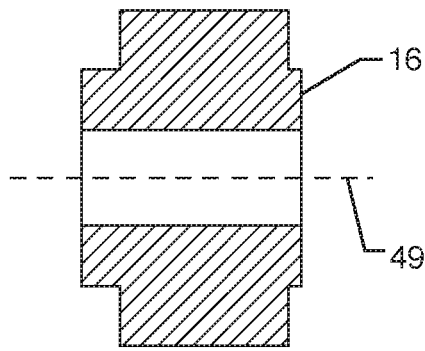
FIG. 6C is a sectional view taken along lines 6C-6C from FIG. 6B.
Figure 6D:
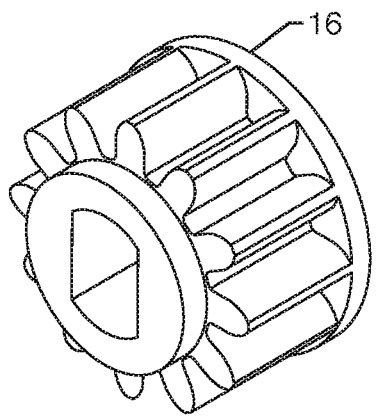
FIG. 6D is an isometric view of the structure of FIG. 6A.
Figure 6E:
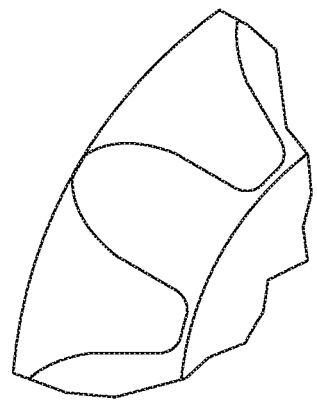
FIG. 6E is an enlarged view taken along lines 5E-5E from FIG. 6A.
Figure 7B:
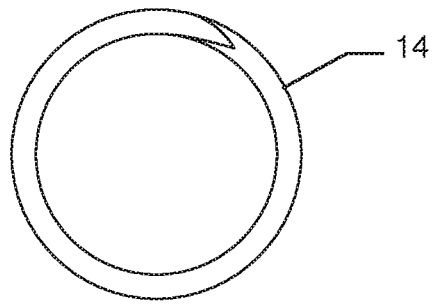
FIG. 7B is a top view of the structure of FIG. 7A.
Figure 7C:
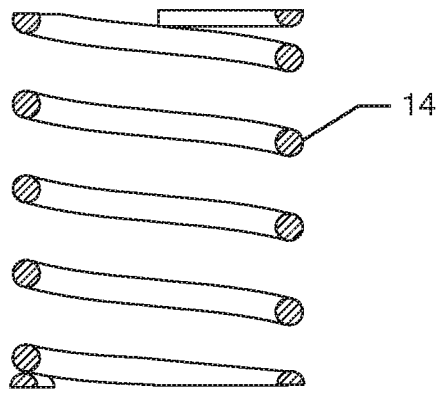
FIG. 7C is a sectional view taken along lines 7C-7C from FIG. 7A.
Figure 7A:
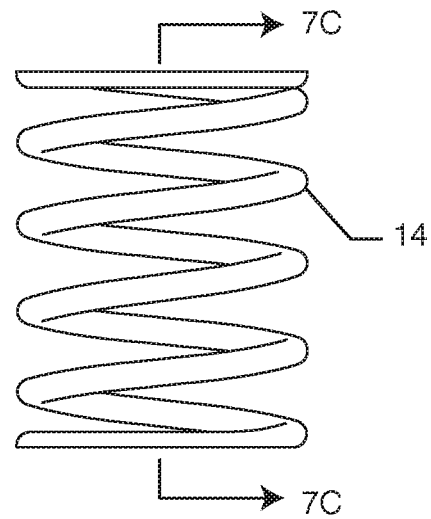
FIG. 7A is a front view of a clutch spring of the structure of FIGS. 1A and 1B.
Figure 7D:
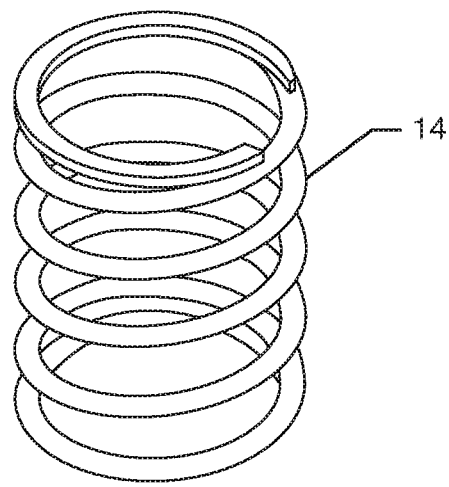
FIG. 7D an isometric view of the structure of FIG. 7A.

As shown herein, most specifically in FIGS. 3F, 5E and 6E, the manual over-ride spur gear 59, the motor coupling spur gear 16 and the intermediate spur gear 15 are all straight spur gears. This is because the gears 59 and 15 have to slide past one another to disengage and engage easily as they translate with respect to one another along their spin axes. If a different gear shaped was used, such as a helical spur gear or a herringbone spur gear, it would be difficult to disengage the gears when the user attempted to access the knob 45.

If a power outage occurs, the motor fails or the electronics fail, the electric motor 20 can no longer close the ball valve 4. Furthermore, it would be harder to manually turn the ball valve if one was also trying to manually turn the electric motor 20. Therefore, it is desired to be able to disengage the electric motor 20 and manually close the ball valve 4. When a user presses downwards on the knob 45, the knob 45 and the manual over-ride primary shaft 18 are able to be displaced (slide) downwards and along their spin axes. This then moves the gearing 59 on the manual over-ride primary shaft 18 to a position which is below the intermediate spur gear 15, or in other words the gears have become disengaged.

When the user is pressing down, they are overcoming the force of the clutch spring 14. When the user releases the knob 45, the clutch spring 14 will force the manual over-ride primary shaft 18 upwards back into its upper position. Because the user must manually overcome the force of the clutch spring 14, it is desired that the spring provide enough force to keep the manual over-ride primary shaft 18 in its upper position for normal use, but also not provide too much force such that it is hard to manually depress the knob 45 and manual over-ride primary shaft 18. When the user presses downwards on the knob 45, they have disengaged the gearing to the electric motor 20, yet they still have a direct connection to the ball valve 4, which is due to the sliding of the manual over-ride primary shaft 18 over the clutch shaft 13. The user can then turn the knob 45 manually and either close, open or change the position of the ball valve 4 into any increment of being between fully opened or fully closed. To help make this manual process as clear as possible, the knob includes the language of "PUSH & TURN".

Again, the knob 45 can be non-rotatably attached to the manual over-ride primary shaft 18 through a variety of means known to those skilled in the art. In this example a screw is used to attach the knob to the manual over-ride primary shaft. However, both parts could be molded as one part. For example, the knob 45 and the manual over-ride primary shaft 18 could be molded as one continuous and integrally formed part.

It is understood in this embodiment that three overall gears have been used. However, those skilled in the art will appreciate that just two gears could have been used. In other words, it would be possible to eliminate the intermediate spur gear 15 if the device was repackaged. Likewise, four or more gears could have been used. Using different gears allows a product designer the ability to change torques and speed of movements to facilitate various design intents. The number of gears used can be dependent upon the packaging constraints based upon the various motors sourced for each particular application. Whether 2, 3, 4 or more gears are used, it does not change the principle teaching of this novel invention.

The parts shown and described herein can be manufactured from a range of materials including plastics, metals, composites or the like. Most likely, these parts will be made from an injection molded plastic such that mass quantities can easily be produced.

Although this particular embodiment has been described in detail for purposes of illustration, various modifications may be made to it without departing from the scope and spirit of the invention. Accordingly, the invention is not to be limited, except as by the appended claims.

Numerals:
1 Main Valve Body
2 Adapter, Ball Valve
3 Seat
4 Ball
5 Flow Turbine
6 Turbine Bearing
10 Valve Stem
11t Temperature Sensor
11p Pressure Sensor
12 Main Housing Base
13 Clutch Shaft
14 Clutch Spring
15 Intermediate Spur Gear
16 Motor Coupling Spur Gear
17 Gear Pin
18 Manual Over-Ride Primary Shaft
19 Motor Mounting Base
20 Motor Assembly
21 Lower Cover Housing
22 Cable Assembly
23 Motor/Switch Interface Board
24 Screw
25 Thread Forming Screw
26 Thread Forming Screw
28 O-Ring
29 O-Ring
30 O-Ring
36 Turbine Outlet, Positive Stop
37 O-Ring
45 Manual Motor Disengagement Knob
47 Cover Sub-Assembly
48 Intermediate Spur Gear Axis
49 Motor Coupling Spur Gear Axis
54 Fluid Inlet
55 Fluid Outlet
56 Fluid Control Device Processor
57 Fluid Control Device Input/Output Port
58 Manual Over-Ride Primary Shaft Axis
59 Manual Over-Ride Primary Shaft Spur Gear
60 Electric Motor Output Shaft
61 Clutch Shaft Axis
62 Extensions
63 Recessions
64 Smaller Diameter Portion
65 Knob Extension
66 Shaft Distal End
67 Raised Narrow Portion
68 Arrow Indicia
69 Housing Indicia
70 Flat Side
100 Fluid Control Device

101 Manual Over-Ride Control Mechanism
102 First Position
103 Second Position

What is claimed is:

1. A fluid control device connectable in series to a fluid pipe, the fluid control device comprising:
   a main valve body including a fluid inlet in fluidic communication with a fluid outlet and configured to be connectable in series to the fluid pipe;
   a fluid valve disposed in series within the main valve body separating the fluid inlet and fluid outlet, the fluid valve controlling a fluid flow through the main valve body, wherein the fluid valve is a ball valve;
   an electric motor mechanically connected to the fluid valve, the electric motor configured to open and close the fluid valve;
   a temperature sensor coupled to the main valve body monitoring a temperature of the fluid flow within the main valve body;
   a pressure sensor coupled to the main valve body monitoring a pressure of the fluid flow within the main valve body;
   a flow rate sensor coupled to the main valve body monitoring a flow rate of the fluid flow within the main valve body;
   a fluid control device processor in electrical communication with the electric motor, the temperature sensor, the pressure sensor and the flow sensor;
   a fluid control device input/output port in electrical communication with the fluid control device processor, the fluid control device input/output port configured to be in electrical communication with a fluid monitoring and control system; and
   a manual over-ride control mechanism mechanically connected to the fluid valve and accessible by a user, wherein the manual over-ride control mechanism is configured to manually disengage the mechanical connection between the electric motor and the fluid valve while still engaging the fluid valve, thereby allowing the user to manually close or open the fluid valve without the assistance or interference of the electric motor;
   wherein the manual over-ride control mechanism comprises a clutch shaft and a manual over-ride primary shaft, wherein the clutch shaft is rotatably disposed within the fluid control device and mechanically connected to the fluid valve wherein a rotation of the clutch shaft results in the same rotation of the fluid valve, and wherein the manual over-ride primary shaft is translatably connected to the clutch shaft wherein a rotation of the manual over-ride primary shaft results in the same rotation of the clutch shaft yet the manual over-ride primary shaft can still translate with respect to the clutch shaft.

2. The fluid control device of claim 1, wherein the manual over-ride primary shaft includes a manual over-ride primary shaft spur gear, and wherein the manual over-ride primary shaft is translatable relative to the clutch shaft between a first position and a second position by the user, wherein in the first position the manual over-ride primary shaft spur gear is mechanically connected to an electric motor output shaft of the electric motor, and wherein in the second position the manual over-ride primary shaft spur gear is not mechanically connected to the electric motor output shaft.

3. The fluid control device of claim 2, including a manual motor disengagement knob fixedly attached to the manual over-ride primary shaft, wherein the manual motor disengagement knob is disposed at least partially accessible to the user.

4. The fluid control device of claim 3, including a bias element disposed between the manual over-ride primary shaft and the clutch shaft, wherein the bias element is configured to bias the manual over-ride primary shaft to the first position.

5. The fluid control device of claim 4, wherein the bias element is a clutch spring.

6. The fluid control device of claim 5, including a motor coupling spur gear fixedly attached to the electric motor output shaft, wherein the motor coupling spur gear is mechanically connected to the manual over-ride primary shaft spur gear when the manual over-ride primary shaft is in the first position.

7. The fluid control device of claim 6, including an intermediate spur gear rotatably connected within the fluid control device and disposed between the motor coupling spur gear and the manual over-ride primary shaft spur gear, wherein the intermediate spur gear is mechanically connected to the manual over-ride primary shaft spur gear when the manual over-ride primary shaft is in the first position.

8. The fluid control device of claim 7, wherein the manual over-ride spur gear, the motor coupling spur gear and the intermediate spur gear are all straight spur gears.

9. The fluid control device of claim 8, wherein the temperature sensor and pressure sensor are disposed downstream of the fluid valve on a fluid outlet side.

10. The fluid control device of claim 9, wherein the fluid control device input/output port is configured to be in electrical communication with the fluid monitoring and control system through a hard-wired communication line or through a wireless transmitter and receiver.

11. A fluid control device connectable in series to a fluid pipe, the fluid control device comprising:
    a main valve body including a fluid inlet in fluidic communication with a fluid outlet and configured to be connectable in series to the fluid pipe;
    a fluid valve disposed in series within the main valve body separating the fluid inlet and fluid outlet, the fluid valve controlling a fluid flow through the main valve body;
    an electric motor mechanically connected to the fluid valve, the electric motor configured to open and close the fluid valve;
    a fluid control device processor in electrical communication with the electric motor;
    a fluid control device input/output port in electrical communication with the fluid control device processor, the fluid control device input/output port configured to be in electrical communication with a fluid monitoring and control system through a hard-wired communication line or through a wireless transmitter and receiver; and
    a manual over-ride control mechanism mechanically connected to the fluid valve and accessible by a user, wherein the manual over-ride control mechanism is configured to manually disengage the mechanical connection between the electric motor and the fluid valve while still engaging the fluid valve, thereby allowing the user to manually close or open the fluid valve without the assistance or interference of the electric motor;
    wherein the manual over-ride control mechanism comprises a clutch shaft and a manual over-ride primary shaft, wherein the clutch shaft is rotatably disposed within the fluid control device and mechanically connected to the fluid valve wherein a rotation of the clutch shaft results in the same rotation of the fluid valve, and wherein the manual over-ride primary shaft is translatably connected to the clutch shaft wherein a rotation of the manual over-ride primary shaft results in the same rotation of the clutch shaft yet the manual over-ride primary shaft can still translate with respect to the clutch shaft.

12. The fluid control device of claim 11, wherein the manual over-ride primary shaft includes a manual over-ride primary shaft spur gear, and wherein the manual over-ride primary shaft is translatable relative to the clutch shaft between a first position and a second position by the user, wherein in the first position the manual over-ride primary shaft spur gear is mechanically connected to an electric motor output shaft of the electric motor, and wherein in the second position the manual over-ride primary shaft spur gear is not mechanically connected to the electric motor output shaft.

13. The fluid control device of claim 12, including a manual motor disengagement knob fixedly attached to the manual over-ride primary shaft, wherein the manual motor disengagement knob is disposed at least partially accessible to the user.

14. The fluid control device of claim 13, including a clutch spring disposed between the manual over-ride primary shaft and the clutch shaft, wherein the clutch spring is configured to bias the manual over-ride primary shaft to the first position.

15. The fluid control device of claim 14, including a motor coupling spur gear fixedly attached to the electric motor output shaft, wherein the motor coupling spur gear is mechanically connected to the manual over-ride primary shaft spur gear when the manual over-ride primary shaft is in the first position.

16. The fluid control device of claim 15, including an intermediate spur gear rotatably connected within the fluid control device and disposed between the motor coupling spur gear and the manual over-ride primary shaft spur gear, wherein the intermediate spur gear is mechanically connected to the manual over-ride primary shaft spur gear when the manual over-ride primary shaft is in the first position.

17. The fluid control device of claim 16, wherein the manual over-ride spur gear, the motor coupling spur gear and the intermediate spur gear are all straight spur gears and wherein the fluid valve is a ball valve.

18. The fluid control device of claim 17, including a temperature sensor coupled to the main valve body downstream of the fluid valve and monitoring a temperature of the fluid flow within the main valve body, including a pressure sensor coupled to the main valve body downstream of the fluid valve and monitoring a pressure of the fluid flow within the main valve body, including a flow rate sensor coupled to the main valve body downstream of the fluid valve and monitoring a flow rate of the fluid flow within the main valve body, wherein the fluid control device processor is in electrical communication with the temperature sensor, the pressure sensor and the flow sensor.

19. A fluid control device connectable in series to a fluid pipe, the fluid control device comprising:
  a main valve body including a fluid inlet in fluidic communication with a fluid outlet and configured to be connectable in series to the fluid pipe;
  a fluid valve disposed in series within the main valve body separating the fluid inlet and fluid outlet, the fluid valve controlling a fluid flow through the main valve body;
  an electric motor having an electric motor output shaft mechanically connected to the fluid valve, the electric motor configured to open and close the fluid valve;
  a fluid control device processor in electrical communication with the electric motor;
  a fluid control device input/output port in electrical communication with the fluid control device processor, the fluid control device input/output port configured to be in electrical communication with a fluid monitoring and control system through a hard-wired communication line or through a wireless transmitter and receiver; and
  a manual motor disengagement knob at least partially accessible to a user and mechanically connected to the fluid valve, wherein the manual motor disengagement knob is configured to manually disengage the mechanical connection between the electric motor and the fluid valve while still engaging the fluid valve, thereby allowing the user to manually close or open the fluid valve without the assistance or interference of the electric motor;
  a clutch shaft rotatably disposed within the fluid control device and mechanically connected to the fluid valve wherein a rotation of the clutch shaft results in the same rotation of the fluid valve;
  a manual over-ride primary shaft translatably connected to the clutch shaft wherein a rotation of the manual over-ride primary shaft results in the same rotation of the clutch shaft yet the manual over-ride primary shaft can still translate with respect to the clutch shaft, wherein the manual motor disengagement knob is fixedly attached to the manual over-ride primary shaft, and wherein the manual over-ride primary shaft includes a manual over-ride primary shaft spur gear, wherein the manual over-ride primary shaft is translatable relative to the clutch shaft between a first position and a second position by the user, wherein in the first position the manual over-ride primary shaft spur gear is mechanically connected to the electric motor output shaft of the electric motor, and wherein in the second position the manual over-ride primary shaft spur gear is not mechanically connected to the electric motor output shaft;
  a clutch spring disposed between the manual over-ride primary shaft and the clutch shaft, wherein the clutch spring is configured to bias the manual over-ride primary shaft to the first position;
  a motor coupling spur gear fixedly attached to the electric motor output shaft, wherein the motor coupling spur gear is mechanically connected to the manual over-ride primary shaft spur gear when the manual over-ride primary shaft is in the first position; and
  an intermediate spur gear rotatably connected within the fluid control device and disposed between the motor coupling spur gear and the manual over-ride primary shaft spur gear, wherein the intermediate spur gear is mechanically connected to the manual over-ride primary shaft spur gear when the manual over-ride primary shaft is in the first position.

20. A fluid control device connectable in series to a fluid pipe, the fluid control device comprising:
  a main valve body including a fluid inlet in fluidic communication with a fluid outlet and configured to be connectable in series to the fluid pipe;
  a fluid valve disposed in series within the main valve body separating the fluid inlet and fluid outlet, the fluid valve controlling a fluid flow through the main valve body;

an electric motor mechanically connected to the fluid valve, the electric motor configured to open and close the fluid valve;
a fluid control device processor in electrical communication with the electric motor; and
a manual over-ride control mechanism accessible by a user that is rotatably and translatably connected with respect to the main valve body, the manual over-ride control mechanism rotatable about an axis in common with the fluid valve, wherein a rotation of the manual over-ride control mechanism results in a rotation of the fluid valve, and wherein the manual over-ride control mechanism is translatable along the axis from a first position to a second position;
wherein in the first position, the electric motor is mechanically connected to the fluid valve through the manual over-ride control mechanism; and
wherein in the second position, the electric motor is not mechanically connected to the fluid valve while the manual over-ride control mechanism is still connected to the fluid valve, thereby allowing the user to manually close or open the fluid valve without the assistance or interference of the electric motor.

* * * * *